US012678872B2

(12) United States Patent 
Bucks et al.

(10) Patent No.: US 12,678,872 B2 
(45) Date of Patent: Jul. 14, 2026

(54) RECIPROCATING SAW BLADE

(71) Applicant: BLACK & DECKER INC., New Britain, CT (US)

(72) Inventors: Brent L. Bucks, Lakewood Ranch, FL (US); Jeremy A. Lowder, Shelbyville, KY (US)

(73) Assignee: BLACK & DECKER INC.

( * ) Notice: Subject to any disclaimer, the term of this patent is extended or adjusted under 35 U.S.C. 154(b) by 108 days.

(21) Appl. No.: 18/785,739

(22) Filed: Jul. 26, 2024

(65) Prior Publication Data

US 2024/0383058 A1 Nov. 21, 2024

Related U.S. Application Data

(63) Continuation of application No. 17/560,528, filed on Dec. 23, 2021, now Pat. No. 12,076,803, which is a continuation of application No. 16/886,318, filed on May 28, 2020, now Pat. No. 11,241,748, which is a continuation of application No. 15/045,529, filed on Feb. 17, 2016, now Pat. No. 10,702,934, which is a continuation of application No. 12/261,186, filed on Oct. 30, 2008, now abandoned.

(60) Provisional application No. 61/007,232, filed on Dec. 11, 2007.

(51) Int. Cl.
B23D 61/12 (2006.01)
B23D 65/02 (2006.01)

(52) U.S. Cl.
CPC ....... B23D 61/1265 (2024.05); B23D 61/128 (2013.01); B23D 65/02 (2013.01)

(58) Field of Classification Search
CPC .... B23D 1/121; B23D 61/126; B23D 61/128; B23D 65/026; B23D 61/121; B23D 65/02; Y10T 83/9319; Y10T 83/936
USPC ............. 83/835, 846–855; 30/355, 392–394; D8/20
See application file for complete search history.

(56) References Cited

U.S. PATENT DOCUMENTS

| | | | |
|---|---|---|---|
| 349,143 | A | 9/1886 | Clemson |
| 1,390,400 | A | 9/1921 | Threet |
| 1,876,945 | A | 9/1932 | Hutchings |
| 2,646,094 | A | 7/1953 | Russell |
| 2,890,728 | A | 6/1959 | Craven |

(Continued)

FOREIGN PATENT DOCUMENTS

| | | |
|---|---|---|
| DE | 1503939 A1 | 9/1969 |
| DE | 8805767 U1 | 6/1988 |

(Continued)

*Primary Examiner* — Ghassem Alie
(74) *Attorney, Agent, or Firm* — Dickinson Wright PLLC

(57) ABSTRACT

A reciprocating saw blade includes a body with a shank end configured to secure the blade with a reciprocating saw, a plunging end configured to enter a workpiece, and a cutting edge and opposite back edge extending between the shank end and the plunging end. The cutting edge is formed to include a plurality of teeth arranged in a repeating pattern that includes left set teeth and right set teeth, the plurality of additional teeth being substantially the same size as each other and as the third tooth, wherein the plurality of additional gullets are substantially the same size as each other, and wherein the enlarged first gullet is longer in an axial direction than each of the plurality of additional gullets.

20 Claims, 4 Drawing Sheets

(56) References Cited

U.S. PATENT DOCUMENTS

| | | | |
|---|---|---|---|
| 2,916,066 | A | 12/1959 | Morse |
| 3,033,251 | A | 5/1962 | Atkinson et al. |
| 3,061,927 | A | 11/1962 | Von Frankenberg Und Ludwigsdorf |
| 3,111,970 | A | 11/1963 | Lou et al. |
| 3,357,462 | A | 12/1967 | Craven |
| 3,477,479 | A | 11/1969 | Doty |
| 3,964,163 | A | 6/1976 | Russo |
| 4,027,390 | A | 6/1977 | Kendzior |
| 4,802,396 | A * | 2/1989 | Kuklinski ............ B23D 61/121 |
| | | | 83/849 |
| 5,119,708 | A * | 6/1992 | Musgrove ............ B23D 61/128 |
| | | | 83/835 |
| 5,295,426 | A | 3/1994 | Planchon |
| 5,484,473 | A * | 1/1996 | Bontempi ................ B03C 3/12 |
| | | | 96/96 |
| 5,517,889 | A | 5/1996 | Logan |
| 5,848,473 | A | 12/1998 | Brandenburg, Jr. |
| 5,855,158 | A | 1/1999 | Donofrio |
| 5,884,547 | A | 3/1999 | Carlsen et al. |
| 5,918,525 | A | 7/1999 | Schramm |
| 6,125,544 | A | 10/2000 | Eriksson et al. |
| 6,244,152 | B1 | 6/2001 | Di Nicolantonio |
| 6,427,573 | B1 | 8/2002 | Carlsen et al. |
| 6,601,495 | B2 | 8/2003 | Cranna |
| D482,945 | S * | 12/2003 | Grolimund ..................... D8/20 |
| 6,782,781 | B2 | 8/2004 | Rack |
| 7,127,979 | B2 | 10/2006 | Kocher et al. |
| 7,174,823 | B2 | 2/2007 | Cranna |
| 7,225,714 | B2 | 6/2007 | Rompel et al. |
| D565,369 | S * | 4/2008 | Dawson .......................... D8/20 |
| D608,611 | S | 1/2010 | Lowder |
| 7,806,033 | B2 | 10/2010 | Kocher et al. |
| 2002/0184988 | A1 | 12/2002 | Rohman et al. |
| 2003/0010179 | A1 | 1/2003 | McLuen |
| 2003/0051593 | A1 | 3/2003 | Kocher et al. |
| 2005/0211046 | A1 * | 9/2005 | Thomas ............... B23D 61/121 |
| | | | 83/835 |
| 2006/0130628 | A1 * | 6/2006 | Rompel ............... B23D 61/121 |
| | | | 83/846 |
| 2008/0307936 | A1 | 12/2008 | Elliston et al. |

FOREIGN PATENT DOCUMENTS

| | | |
|---|---|---|
| DE | 202004017351 U1 | 3/2006 |
| EP | 0786302 B1 | 6/2002 |

\* cited by examiner

RECIPROCATING SAW BLADE

CROSS-REFERENCE TO RELATED APPLICATIONS

This application claims priority under 35 U.S.C. § 120 as a continuation of U.S. patent application Ser. No. 17/560, 528, filed Dec. 23, 2021, titled "Method of Manufacturing Reciprocating Saw Blade," which is a continuation of U.S. patent application Ser. No. 16/886,318, filed May 28, 2020, titled "Reciprocating Saw Blade with Plunge Nose," which is a continuation of U.S. patent application Ser. No. 15/045, 529, filed Feb. 17, 2016, titled "Reciprocating Saw Blade with Plunge Nose," which is a continuation of U.S. patent application Ser. No. 12/261,186, filed Oct. 30, 2008, titled "Reciprocating Saw Blade with Plunge Nose," which claims the benefit of U.S. Provisional Application No. 61/007,232, filed on Dec. 11, 2007. The entire disclosure of each of these applications is incorporated herein by reference.

FIELD

The present disclosure relates to reciprocating saw blades and, more particularly, to reciprocating saw blades with a plunge nose, and to methods of manufacturing such reciprocating saw blades.

BACKGROUND

Numerous trades utilize reciprocating saws and blades to cut various objects. Plumbers utilize reciprocating saw blades to cut PVC pipe as well as to rough in holes in sub flooring. Heating and ventilating contractors utilize reciprocating saw blades to cut vents into sub flooring. Contractors utilize reciprocating saws to frame windows, doors, and the like. Also, renovation contractors utilize reciprocating saw blades to cut through nails and the like to remove walls and the like. These users rely on reciprocating saw blades that cut fast, have a desirable blade life or durability and enable easy plunge cutting that provides a fast, as well as a controlled cut. Available reciprocating saw blades that are utilized to plunge cut have a nose that, when it is plunged into the sub flooring or a workpiece, creates an enlarged inaccurate kurf. Thus, the reciprocating saw blade haphazardly bites into the workpiece. This slows the cutting process as well as provides the user with little or no control when plunging the reciprocating saw blade into the workpiece. Thus, it would be desirable to have a reciprocating saw blade that rapidly plunges into the workpiece to provide an accurate kurf while enabling fast cutting of the workpiece.

Accordingly, the present disclosure provides the art with such a reciprocating saw blade. The present reciprocating saw blade pierces the workpiece for fast and accurate plunge cutting. The present saw blade provides easy plunge cutting and provides the user with a controlled cut which, in turn, is also a fast cut. The reciprocating saw blade has an extended blade life that provides significant durability. The present reciprocating saw blade provides faster removal of swarf from the kurf. The present saw blade provides a first full raker tooth that quickly pierces the workpiece to provide faster cutting of the workpiece.

SUMMARY

In accordance with the first aspect of the disclosure, a reciprocating saw blade comprises a body with two ends and two edges. A first shanking end secures the blade with the reciprocating saw. The second end is a plunging end to enter into a workpiece. A first edge has a plurality of teeth and gullets. The second back edge opposes the first edge. The plurality of teeth has a first tooth immediately adjacent the plunging end. The first tooth is a full tooth and is also a raker tooth or unset tooth. The first tooth has a relief face angle of about 35° to 50°. A first gullet is adjacent the first tooth. The first gullet has a size at least 1.5 times the gullet size of the remaining gullets of the plurality of gullets. The gullet size is generally from 2 to 5.5 times the size of the remaining gullets of the plurality of gullets. The plunging end has an end face on an angle of about 35° to 45° with respect to a longitudinal axis of the blade. The plunging end has an end surface intersecting the first tooth to form a cutting edge. The plurality of teeth is set teeth.

Accordingly to another aspect of the disclosure, a reciprocating saw blade comprises a body with two ends and two edges. The first shanking end secures the blade with a reciprocating saw. A second plunging end is present to enter a workpiece. A first edge has a plurality of teeth and gullets. The second back edge opposes the first edge. The plurality of teeth has a first tooth immediately adjacent the plunging end. The first tooth is a full tooth and is also a raker or unset tooth. The first tooth has a relief face angle of about 35° to 50°. The remainder of the plurality of teeth have substantially the same size, also the gullets have substantially the same size. One tooth immediately adjacent the first tooth of the plurality of teeth is missing from the plurality of teeth forming a gap between the first tooth and the plurality of teeth. Two teeth of the plurality of teeth may be missing forming a larger gap. The plunging end has an end surface on an angle of about 35° to 45° with respect to the longitudinal axis of the blade. The plunging end has an end surface intersecting the first tooth to form a cutting edge. The plurality of teeth is set teeth.

Accordingly to a third aspect of the disclosure, a method for manufacturing a reciprocating saw blade comprises forming a plurality of teeth into a coil stock. The coil stock is fed into a die set. Teeth on the coil stock are located in the die set. A portion of the teeth on the coil stock is flattened. A first tooth and a first gullet of a reciprocating saw blade and a third tooth are formed into the flattened portion of the coil stock. The reciprocating saw blade is formed with a first tooth and a first gullet with the first gullet being enlarged with respect to the remaining gullets of a plurality of gullets. The flattening step includes flattening at least three teeth of the plurality of teeth. The coil stock is punched to form the first tooth and the first gullet of the saw blade. The teeth are milled and set into the coil stock. The set teeth are flattened to form the first tooth as a raker or unset tooth. The first gullet has size 1.5 to 5.5 times the size of the remaining gullets of the plurality of gullets.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figures 1, 2:
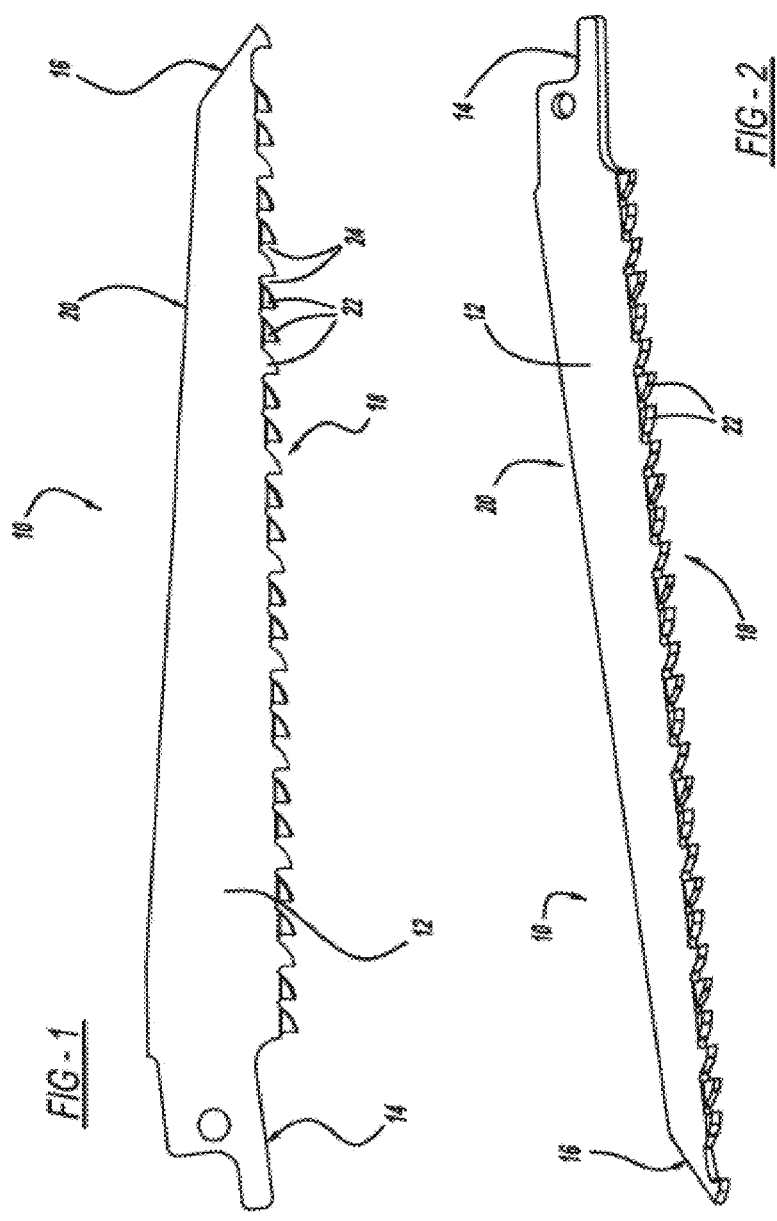
FIG. 1 is a side elevational view of a reciprocating saw blade in accordance with the present disclosure.
FIG. 2 is a perspective view of FIG. 1 rotated approximately 90°.

Turning to the figures, particularly FIG. 1, a reciprocating saw blade is illustrated and designated with the reference numeral 10. The reciprocating saw blade 10 includes a body 12 which has a first shanking end 14 and a plunging nose end 16. The body 12 includes two edges. The first edge is a cutting edge 18 and the second edge is an opposing back edge 20. The cutting edge 18 includes a plurality of teeth 22. Each tooth includes a gullet 24. The gullets 24 are substantially identical and all have substantially the same size. Additionally, the teeth 22 are substantially identical and all have substantially the same size. Also, the teeth 22 are set teeth alternating left and right, separated by a raker, left, right. The left and right set can be alternated to provide a desired saw blade. The set of the teeth provides spacing for the body 12 and clearance for the back edge so that it can be maneuvered through the created kurf.

The plurality of teeth 22 includes a rake face 26 and a relief face 28. The rake face 26 and relief face 28 intersect one another to form a cutting edge 30. The rake face 26 is preferably at a rake angle α of about 3° to 10°. The relief face 28 is at a relief angle β from about 15° to 35°. The tooth 22 has an included angle δ of about 45° to about 72°.

Figures 3, 4:
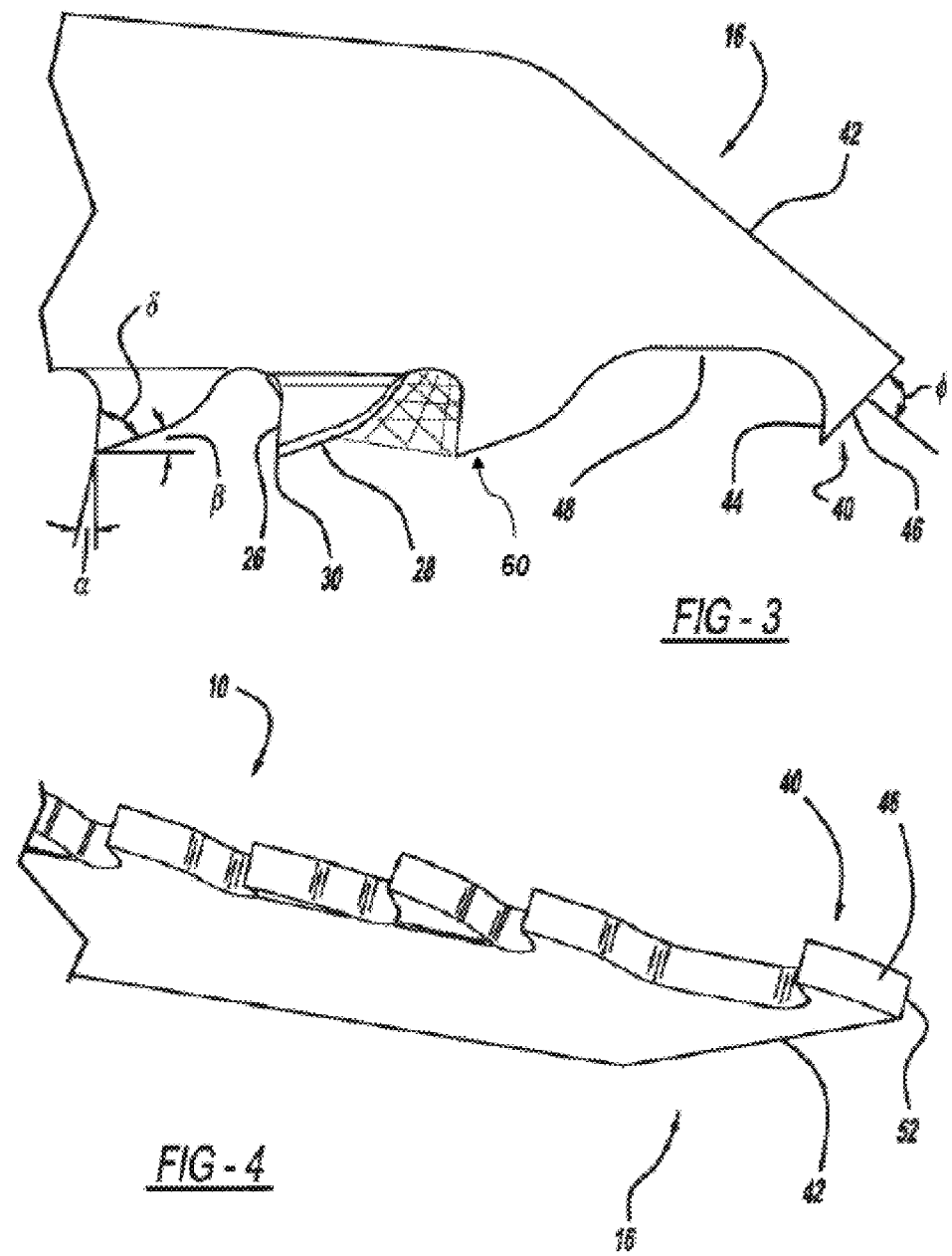
FIG. 3 is an enlarged elevational view of the nose of FIG. 1.
FIG. 4 is a view like FIG. 3 rotated approximately 90°.

The gullets 24 have a desired volume as illustrated in the shaded area of FIG. 3. The volume of each of the gullets 24 is substantially the same for all of the gullets 24.

The plunging end 16 has a first tooth 40 adjacent the end surface 42 of the plunging nose 16. The tooth 40 is a full tooth and is also a raker or unset tooth. The tooth 40 has substantially the same rake face 44 and rake angle as that previously discussed. A relief surface 46 is formed on the plunging end by removing a portion of the first tooth on a relief angle φ from about 35° to about 50° so that the first tooth has a somewhat different configuration than the other teeth. Preferably, the relief angle is about 45°. The first tooth 40 may be offset toward the back edge 20 from a line through the cutting edges 30 to about 0.25 mm. This insures a sharp cutting edge on the first tooth 40.

A first gullet 48 is positioned adjacent the rake face 44. The first gullet 48 has a size from 1.5 to 5.5 times, preferably 2 to 5.5 times, the size of the remaining gullets 24. Thus, an enlarged gullet 48 is formed between the first tooth 40 and the remainder of the plurality of teeth 22. A second tooth has been removed or is missing from the plurality of teeth 22 to form the gap which creates the first gullet 48. Thus, by removing a tooth, this allows the first tooth 40 to cut into the workpiece so the third tooth 60 (first tooth of the remainder of the plurality of teeth 22) cannot engage or alter the path of the first tooth. Additionally, the third tooth 60 is preferably a raker or straight tooth This provides for a straight groove cut into the workpiece that is not influenced by the set plurality of teeth 22. Also, by having the first tooth 40 and a larger gullet, faster and greater chip removal is provided as well as an increased cutting speed.

The end surface 42 of the plunge nose 16 is on an angle of 35° to 45° and preferably 39° with respect to the longitudinal axis of the blade. This aggressive angle provides for clearance of the plunge nose 16 to enable it to plunge faster into the workpiece. Also, the end surface 42 intersects the relief surface 46 of the first tooth to form a cutting edge 52 at the tip of the blade. An included angle of about 60° to 90° is formed between the end surface 42 and relief surface 46. This enhances the chipping action of the reciprocating saw blade 10 once the saw blade enters into the kurf of the workpiece.

Figure 5:
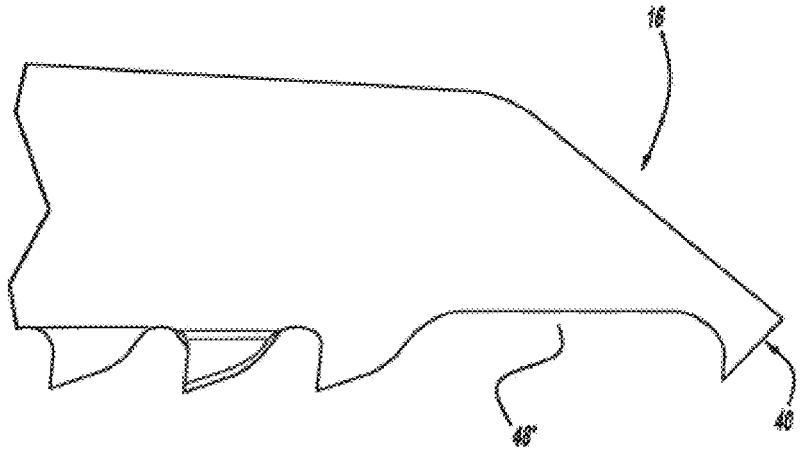
FIG. 5 is an elevational view of an additional embodiment of the present invention.

FIG. 5 illustrates a second embodiment. Here, the saw blade is the same as that previously disclosed; however, two teeth are missing out of the plurality of teeth behind the first tooth 40. This provides an even larger first gullet 48' about 5.5 times the size of the remaining gullets. This enables the fast removal of chips to provide a faster cutting reciprocating saw blade.

Figure 6:
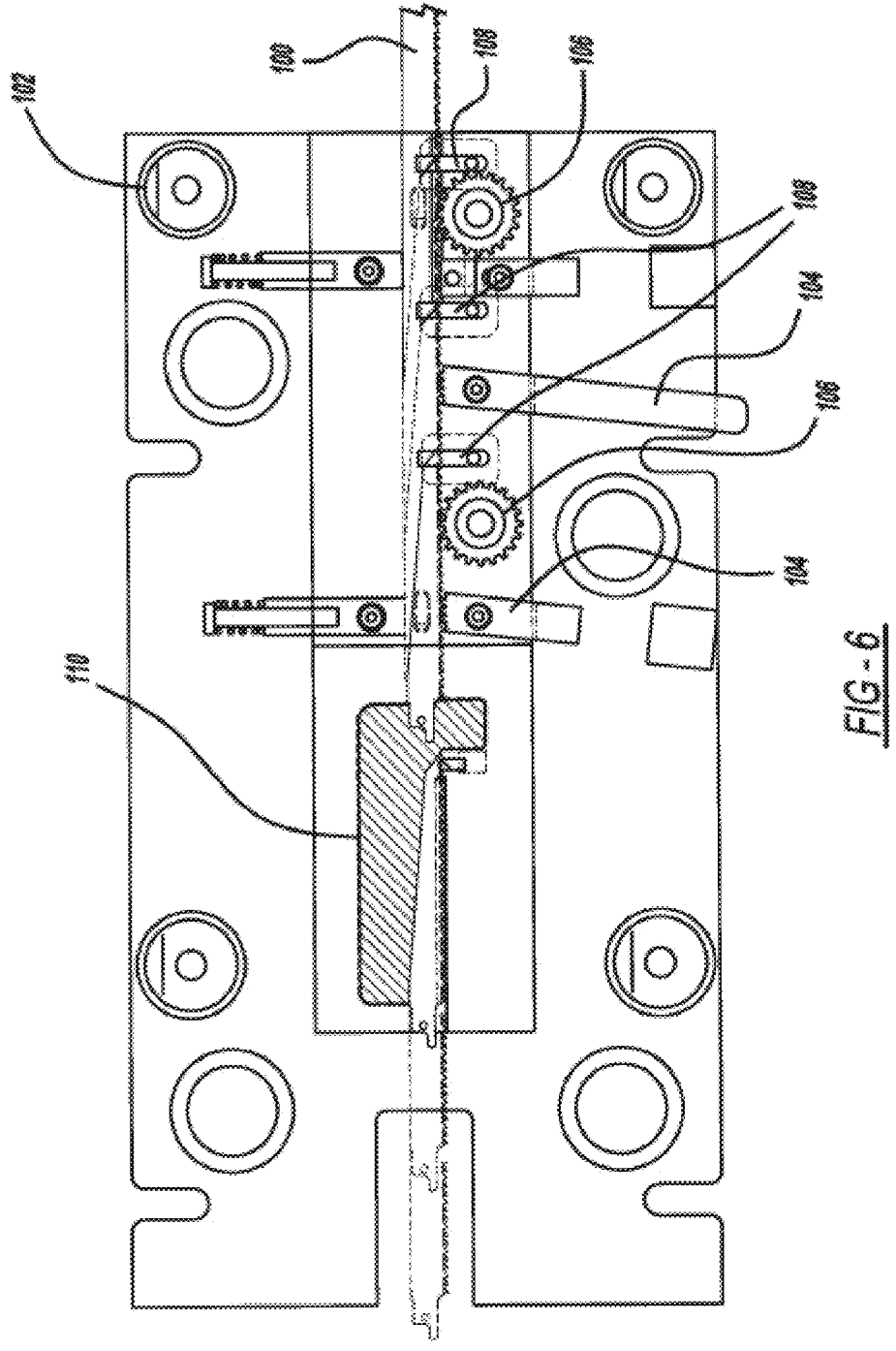
FIG. 6 is a schematic view of a method of manufacturing a saw blade.

Turning to FIG. 6, a method for manufacturing the blades is illustrated. Here, a stock coil 100 is fed into a die set 102. The coil stock 100 has had the teeth milled and set into the coil. The coil is unwound to have the teeth milled and set and then rewound after the teeth have been milled and set into the coil stock 100. The coil stock 100 is then fed into the die set 102. As the coil stock 100 enters the die set 102, the teeth 22 are located by a pilot stop 104. Two pilot stops 104 are illustrated which may be used on different size reciprocating saw blades. Since the die set 102 may be utilized to stamp 6", 9" and 12" blades, only one die set 102 is needed to manufacture all three sizes. Rollers 106 advance the coil stock 100 into the die set 102. The pilot stops 104 locate the teeth and continue with the coil stock 100 into the die set. Coil stock 100 is stopped to enable a punch 108 to flatten at least three teeth of the teeth. The flattening occurs by compressing the punch together to provide a region that now has no defined tooth set but a straight flat portion. The coil stock 100 continues to be fed into dies 110. As the coil stock 100 is positioned into the dies 110 with the fattened portion at the end of the dies 110. The dies 110 are closed and a punch progression begins to form the first tooth 40 as well as the enlarged gullet 48 into the flattened portion of coil stock to form the saw blade. Also, as this occurs, the coil stock 100 is continuously fed into an opening into the die 110 which forms the shanking end of the next reciprocating blade. It should be noted that the flattening, forming of the first tooth and enlarged gullet, as well as the forming of the shank end, takes place simultaneously in the die set at different locations along the die set. After the punching, the blade 10 exits the die set 102 with a first tooth and gullet as well as the plurality of teeth as explained above.

The description of the invention is merely exemplary in nature and, thus, variations that do not depart from the gist of the invention are intended to be within the scope of the invention. Such variations are not to be regarded as a departure from the spirit and scope of the disclosure.

What is claimed is:

1. A reciprocating saw blade comprising:
   a body extending generally along an axis and having a rear end portion and a front end portion;
   a shank coupled to the rear end portion and configured to be received in a blade holder of a powered saw;
   a non-cutting back edge extending between the rear end portion and the front end portion; and
   a cutting edge extending between the rear end portion and the front end portion opposite the back edge, the cutting edge including a plurality of teeth that include an unset front tooth immediately adjacent the front end portion and a plurality of additional teeth following the front tooth toward the rear end portion, the front tooth and the plurality of additional teeth each having cutting tips substantially aligned along a line parallel to the axis, wherein the plurality of additional teeth includes an unset leading tooth closest to the front tooth and a plurality of left set teeth and right set teeth following the leading tooth toward the rear end portion, the plurality of additional teeth each being substantially the same size as each other with each additional tooth spaced from an adjacent additional tooth by a first distance, and wherein the front tooth is spaced from the leading tooth by a second distance that is greater than the first distance, the second distance being at least 1.5 times as long as the first distance.

2. The reciprocating saw blade of claim 1, further comprising a front gullet between the front tooth and the leading tooth and plurality of additional gullets between each adjacent additional tooth, the front gullet having a first volume that is larger than a second volume of each of the additional gullets.

3. The reciprocating saw blade of claim 2, wherein the front gullet is free of any teeth between the front tooth and the leading tooth.

4. The reciprocating saw blade of claim 1, wherein the front tooth has a different configuration than each of the additional teeth.

5. The reciprocating saw blade of claim 1, wherein the front end portion comprises a nose including a front tip portion axially forward of the front tooth, a first front edge extending from the back edge to the front tip portion at a first acute angle relative to the axis, and a relief edge of the front tooth extending from a cutting tip of the front tooth to the front tip portion at a second acute angle relative to the axis.

6. The reciprocating saw blade of claim 5, wherein the front tip portion includes a sharp point at a junction between the front edge and the relief edge of the front tooth.

7. The reciprocating saw blade of claim 5, wherein the second acute angle is between about 35° and about 50°.

8. The reciprocating saw blade of claim 1, wherein each of the additional teeth includes a rake face and a relief face that intersect at the cutting tip.

9. The reciprocating saw blade of claim 8, wherein each rake face is at a rake angle between about 3° and about 10° relative to a line perpendicular to the axis.

10. The reciprocating saw blade of claim 8, wherein each relief face is at a relief angle between about 15° and about 35° relative to the axis.

11. The reciprocating saw blade of claim 1, wherein at least a portion of the back edge is non-parallel to the axis.

12. A reciprocating saw blade comprising:
a body extending along an axis and including a shank end configured to couple the reciprocating saw blade with a reciprocating saw, a nose end opposite the shank end, a cutting edge extending between the shank end and the nose end, and a back edge opposite the cutting edge and extending between the shank end and the nose end,
wherein the cutting edge includes a plurality of set teeth arranged in a pattern that includes left set teeth, right set teeth, and a plurality of gullets, each of the plurality of set teeth and the plurality of gullets having substantially the same size,
wherein the cutting edge additionally includes a first tooth immediately adjacent the nose end that is flattened to be unset and has a portion removed to have a different configuration than the plurality of set teeth, wherein the cutting edge additionally includes a third tooth counting consecutively from the first tooth that is flattened to be unset, and
wherein the cutting edge additionally includes a second tooth counting consecutively from the first tooth, at least a portion of the second tooth being removed to form an enlarged gullet between the first tooth and the third tooth, the enlarged gullet having a first volume that is at least 1.5 times a second volume of each of the remaining gullets in the plurality of gullets.

13. The reciprocating saw blade of claim 12, wherein all portions of the second tooth are removed such that the enlarged gullet is free of any teeth between the first tooth and the third tooth.

14. The reciprocating saw blade of claim 12, wherein the nose end includes a front tip portion axially forward of the first tooth, a first front edge extending from the back edge to the front tip portion at a first acute angle relative to the axis, and a relief edge of the first tooth extending from a cutting tip of the first tooth to the front tip portion at a second acute angle relative to the axis.

15. The reciprocating saw blade of claim 14, wherein the front tip portion includes a sharp point at a junction between the front edge and the relief edge of the front tooth.

16. The reciprocating saw blade of claim 12, wherein each of the plurality of set teeth includes a rake face and a relief face that intersect at the cutting tip.

17. The reciprocating saw blade of claim 16, wherein each rake face is at a rake angle between about 3° and about 10° relative to a line perpendicular to the axis.

18. The reciprocating saw blade of claim 17, wherein each relief face is at a relief angle between about 15° and about 35° relative to the axis.

19. The reciprocating saw blade of claim 12, wherein at least a portion of the back edge is non-parallel to the axis.

20. A reciprocating saw blade comprising:
a body extending generally along an axis and having a rear end portion and a front end portion;
a shank coupled to the rear end portion and configured to be received in a blade holder of a powered saw;
a non-cutting back edge extending between the rear end portion and the front end portion with at least a portion of the back edge non-parallel to the axis; and
a cutting edge extending between the rear end portion and the front end portion opposite the back edge, the cutting edge including a plurality of teeth that include an unset front tooth immediately adjacent the front end portion and a plurality of additional teeth following the front tooth toward the rear end portion, the front tooth and the plurality of additional teeth each having cutting tips substantially aligned along a line parallel to the axis,
wherein the plurality of additional teeth includes an unset leading tooth closest to the front tooth and a plurality of left set teeth and right set teeth following the leading tooth toward the rear end portion, the plurality of additional teeth each being substantially the same size as each other with each additional tooth spaced from an adjacent additional tooth by a first distance,
wherein the front tooth is spaced from the leading tooth by a second distance that is greater than the first distance, the second distance being between 1.5 times and 5.5 times as long as the first distance and the front tooth having a different configuration than each of the additional teeth, and
wherein the front end portion comprises a nose including a front tip portion axially forward of the front tooth, a first front edge extending from the back edge to the front tip portion at a first acute angle relative to the axis, and a relief edge of the front tooth extending from a cutting tip of the front tooth to the front tip portion at a second acute angle relative to the axis.

* * * * *